US009239015B2

(12) United States Patent
Cowgill

(10) Patent No.: US 9,239,015 B2
(45) Date of Patent: Jan. 19, 2016

(54) CYLINDER PRESSURE BASED PUMP CONTROL SYSTEMS AND METHODS

(75) Inventor: Joel Cowgill, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 580 days.

(21) Appl. No.: 13/571,872

(22) Filed: Aug. 10, 2012

(65) Prior Publication Data

US 2013/0245913 A1    Sep. 19, 2013

Related U.S. Application Data

(60) Provisional application No. 61/610,191, filed on Mar. 13, 2012.

(51) Int. Cl.
*F02D 13/02* (2006.01)
*F02D 35/02* (2006.01)
*F01L 9/02* (2006.01)
*F02D 41/00* (2006.01)

(52) U.S. Cl.
CPC .............. *F02D 13/0207* (2013.01); *F01L 9/02* (2013.01); *F02D 13/0253* (2013.01); *F02D 35/023* (2013.01); *F01L 2820/043* (2013.01); *F02D 2041/001* (2013.01); *Y02T 10/18* (2013.01)

(58) Field of Classification Search
CPC ...... F02D 13/0253; F02D 35/023; F01L 1/24; F01L 9/02; F01L 9/021; F01L 2009/028; F01L 2009/0453; F01L 2820/04; F01L 2820/043
See application file for complete search history.

(56) References Cited

U.S. PATENT DOCUMENTS

| | | | | |
|---|---|---|---|---|
| 4,000,756 A * | 1/1977 | Ule | ............................ | F01L 9/02 |
| | | | | 123/90.11 |
| 5,448,973 A * | 9/1995 | Meyer | ........................ | 123/90.12 |
| 5,619,965 A * | 4/1997 | Cosma et al. | ................. | 123/322 |
| 6,205,975 B1 * | 3/2001 | Ruedin et al. | ................. | 123/322 |
| 2004/0231639 A1 * | 11/2004 | Israel | ......................... | F01L 1/08 |
| | | | | 123/321 |
| 2005/0000499 A1 * | 1/2005 | Ruggiero et al. | ........ | 123/568.14 |
| 2006/0048730 A1 * | 3/2006 | Kenchington et al. | ..... | 123/90.12 |
| 2006/0150935 A1 * | 7/2006 | Donaldson | ................. | F01L 9/02 |
| | | | | 123/90.12 |
| 2006/0283410 A1 * | 12/2006 | Lou | ............................ | 123/90.12 |
| 2006/0283411 A1 * | 12/2006 | Lou | ............................ | 123/90.12 |
| 2007/0089697 A1 * | 4/2007 | Hara et al. | ................. | 123/90.15 |

* cited by examiner

*Primary Examiner* — Erick Solis
*Assistant Examiner* — Anthony L Bacon

(57) ABSTRACT

An engine control system for a vehicle includes a pressure determination module, an adjustment determination module, a target determination module, and a pump control module. The pressure determination module determines a first pressure for a hydraulic fluid provided to fully flexible intake and exhaust valve actuators of an engine. The adjustment determination module determines a pressure adjustment for the first pressure based on a pressure within a cylinder. The target determination module determines a target pressure for the hydraulic fluid based on the first pressure and the pressure adjustment. Based on the target pressure, the pump control module controls a hydraulic fluid pump for an opening timing of an exhaust valve of the cylinder.

18 Claims, 3 Drawing Sheets

CYLINDER PRESSURE BASED PUMP CONTROL SYSTEMS AND METHODS

CROSS-REFERENCE TO RELATED APPLICATIONS

This application claims the benefit of U.S. Provisional Application No. 61/610,191, filed on Mar. 13, 2012. The disclosure of the above application is incorporated herein by reference in its entirety.

STATEMENT OF GOVERNMENT RIGHTS

Portions or all of this invention may have been produced pursuant to U.S. Government Contract No. DE-FC26-05NT42415. The U.S. Government may therefore have certain rights in this invention.

FIELD

The present disclosure relates to internal combustion engines and more particularly to pump control systems and methods for fully flexible valve actuation (FFVA) systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve and/or engine valve timing controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The driver inputs may include, for example, accelerator pedal position, brake pedal position, and/or one or more other suitable driver inputs. The other inputs may include, for example, cylinder pressure measured using a cylinder pressure sensor, one or more variables based on the measured cylinder pressure, and/or one or more other suitable values.

SUMMARY

An engine control system for a vehicle includes a pressure determination module, an adjustment determination module, a target determination module, and a pump control module. The pressure determination module determines a first pressure for a hydraulic fluid provided to intake and exhaust valve actuators of an engine. The adjustment determination module determines a pressure adjustment for the first pressure based on a pressure within a cylinder. The target determination module determines a target pressure for the hydraulic fluid based on the first pressure and the pressure adjustment. Based on the target pressure, the pump control module controls a hydraulic fluid pump for an opening timing of an exhaust valve of the cylinder.

An engine control method for a vehicle includes: determining a first pressure for a hydraulic fluid provided to intake and exhaust valve actuators of an engine; and determining a pressure adjustment for the first pressure based on a pressure within a cylinder. The engine control method further includes: determining a target pressure for the hydraulic fluid based on the first pressure and the pressure adjustment; and, based on the target pressure, controlling a hydraulic fluid pump for an opening timing of an exhaust valve of the cylinder.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts a mixture of air and fuel within cylinders to generate drive torque. A throttle valve regulates airflow into the engine. Fuel is injected by fuel injectors. Spark plugs may generate spark within the cylinders to initiate combustion. Intake and exhaust valves of a cylinder are controlled to regulate flow into and out of the cylinder. Traditionally, opening of the intake and exhaust valves of the cylinder is controlled by one or more camshafts.

Fully flexible valve actuation (FFVA) systems have been developed, however, that enable opening of valves of the engine to be controlled independently of each other. For example, opening of an intake valve of a cylinder can be controlled separately from an exhaust valve of the cylinder. Opening of the intake valve of the cylinder can also be controlled separately from intake valves of other cylinders.

A valve actuator opens and closes an associated intake or exhaust valve based on pressure of a hydraulic fluid provided to the valve actuator by a high pressure pump. The high pressure pump receives hydraulic fluid from a low pressure pump, which draws hydraulic fluid from a reservoir. A control module controls operation (e.g., stroke, displacement, etc.) of the high pressure pump. More specifically, the control module determines a target pressure for the hydraulic fluid provided to the valve actuator and controls the high pressure pump based on the target pressure.

Relative to other times during a combustion cycle, pressure within a cylinder may be high at the time when an exhaust valve of the cylinder is to be opened for the combustion cycle of the cylinder. If the pressure of the hydraulic fluid provided to the valve actuator of the exhaust valve is insufficient to overcome the cylinder pressure at the time that the exhaust valve is to open, the exhaust valve may not open at all, may open later than expected, or may open to a lesser extent than expected.

The control module therefore selectively increases the target pressure based on the cylinder pressure at the time of exhaust valve opening. More specifically, the control module increases the target pressure based on the cylinder pressure when the cylinder pressure is greater than a predetermined pressure. Increasing the target pressure based on the cylinder pressure when the cylinder pressure is greater than the predetermined pressure may ensure proper opening of the exhaust valve.

Figure 1:
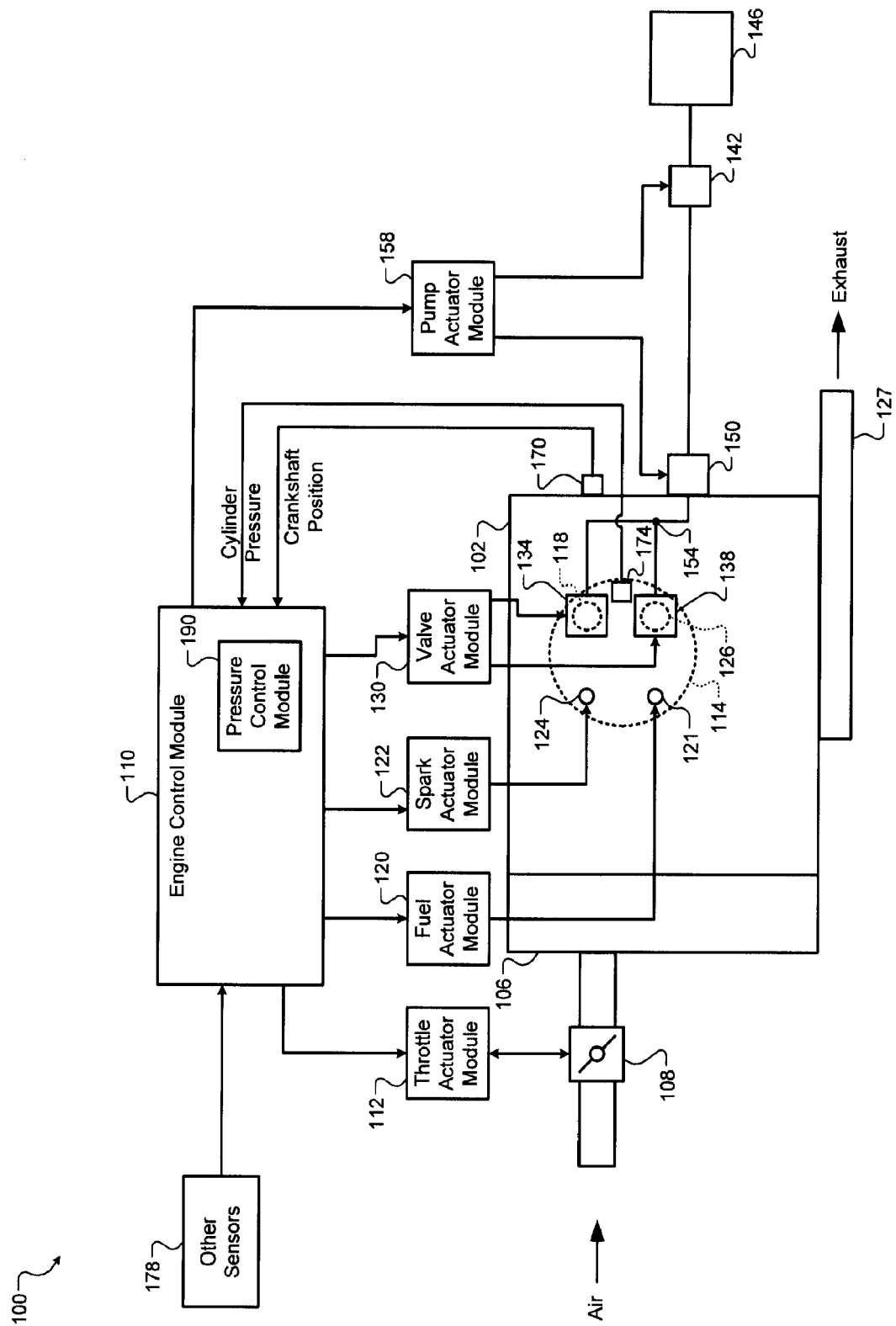
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle. While the engine 102 will be discussed as a spark ignition direct injection (SIDI) engine, the engine 102 may include another suitable type of engine, such as a compression ignition engine. One or more electric motors and/or motor generator units (MGUs) may be provided with the engine 102.

Air is drawn into an intake manifold 106 through a throttle valve 108. The throttle valve 108 may vary airflow into the intake manifold 106. For example only, the throttle valve 108 may include a butterfly valve having a rotatable blade. An engine control module (ECM) 110 controls a throttle actuator module 112 (e.g., an electronic throttle controller or ETC), and the throttle actuator module 112 controls opening of the throttle valve 108.

Air from the intake manifold 106 is drawn into cylinders of the engine 102. While the engine 102 may include more than one cylinder, only a single representative cylinder 114 is shown. Air from the intake manifold 106 is drawn into the cylinder 114 through an intake valve 118. One or more intake valves may be provided with each cylinder.

The ECM 110 controls a fuel actuator module 120, and the fuel actuator module 120 controls fuel injection (e.g., amount and timing) by a fuel injector 121. The ECM 110 may control fuel injection to achieve a desired air/fuel ratio, such as a stoichiometric air/fuel ratio. While fuel is shown and discussed as being injected directly into the cylinder 114, fuel may be injected at other locations in other types of engines, such as into the intake manifold 106 near the intake valves of the cylinders or into mixing chambers associated with the cylinders. A fuel injector may be provided for each cylinder.

The injected fuel mixes with air and creates an air/fuel mixture in the cylinder 114. Based upon a signal from the ECM 110, a spark actuator module 122 may energize a spark plug 124 in the cylinder 114. A spark plug may be provided for each cylinder. Spark generated by the spark plug 124 ignites the air/fuel mixture. Heat generated by compression causes ignition in compression ignition engines and during operation of an engine in a compression ignition (e.g., homogeneous charge compression ignition) mode.

The engine 102 may operate using a four-stroke cycle. The four strokes, described below, are may be referred to as the intake stroke, the compression stroke, the combustion stroke, and the exhaust stroke. During each revolution of a crankshaft (not shown), two of the four strokes occur within the cylinder 114. Therefore, two revolutions crankshaft are necessary for the cylinders to experience all four of the strokes.

During the intake stroke, air from the intake manifold 106 is drawn into the cylinder 114 through the intake valve 118. Injected fuel mixes with air and creates an air/fuel mixture in the cylinder 114. During the compression stroke, a piston (not shown) within the cylinder 114 compresses the air/fuel mixture. During the combustion stroke, combustion of the air/fuel mixture drives the piston, thereby driving the crankshaft. During the exhaust stroke, the byproducts of combustion are expelled through an exhaust valve 126 to an exhaust system 127.

A valve actuator module 130 controls opening and closing of the intake valves and the exhaust valves of the engine 102 based on signals from the ECM 110. More specifically, an intake valve actuator 134 controls actuation (opening, closing, and lift) of the intake valve 118. An exhaust valve actuator 138 controls actuation (opening, closing, and lift) of the exhaust valve 126. The valve actuator module 130 controls the intake and exhaust valve actuators 134 and 138 based on signals from the ECM 110.

The intake and exhaust valve actuators 134 and 138 control opening and closing of the intake and exhaust valves 118 and 126, respectively. The intake and exhaust valve actuators 134 and 138 are fully flexible valve actuators. The intake and exhaust valve actuators 134 and 138 may include, for example, electro-hydraulic actuators, electro-mechanical actuators, or another suitable type of fully flexible valve actuator. Fully flexible valve actuators may be camshaft based valve actuators or camless valve actuators. One fully flexible valve actuator may be provided for each intake valve of the engine 102, and one fully flexible valve actuator may be provided for each exhaust valve of the engine 102.

Fully flexible valve actuators enable actuation of each valve of the engine 102 to be controlled independently of each other valve and enable what may be referred to as fully flexible valve actuation (FFVA). Using FFVA, the flow of gasses into and out of each cylinder can be regulated (via control of intake and exhaust valve opening, closing, and lift) to control the flow into and out of the cylinder and, therefore, the combustion conditions within each cylinder.

The intake and exhaust valve actuators 134 and 138 actuate the intake and exhaust valves 118 and 126, respectively, using a hydraulic fluid. A low pressure pump 142 draws hydraulic fluid from a reservoir 146 and provides hydraulic fluid to a high pressure pump 150. The high pressure pump 150 pressurizes the hydraulic fluid within a fluid rail 154. The valve actuators of the engine, including the intake and exhaust valve actuators 134 and 138, receive hydraulic fluid via the fluid rail 154.

The low pressure pump 142 may be an electrically driven pump. The high pressure pump 150 may be a variable displacement (e.g., stroke) pump that is mechanically driven by the engine 102. A pump actuator module 158 controls operation of the high pressure pump 150. The pump actuator module 158 controls the high pressure pump 150 based on signals from the ECM 110. The pump actuator module 158 may also control application of power (electrical) to the low pressure pump 142.

The valve actuators (including the intake and exhaust valve actuators 134 and 138) each include a three-way valve that is controlled, at a given time, to: (i) apply hydraulic fluid from the fluid rail 154 to open the associated valve; or (ii) return hydraulic fluid back to the reservoir 146. While three-way valves are discussed, another suitable type of valve can be used. The valve actuator module 130 controls the three-way valves of the valve actuators to control opening and closing of the associated valves.

To close a valve and to maintain a valve in a closed position, the valve actuator module 130 actuates the three-way valve of the associated valve actuator to return hydraulic fluid back to the reservoir 146. The valve actuator module 130 actuates the three-way valve of the associated valve actuator to apply hydraulic fluid from the fluid rail 154 to open the valve. The pressure within the fluid rail 154 controls valve opening and distance that a valve may be opened, which can be referred to as valve lift (e.g., in millimeters).

The intake valve 118 and the exhaust valve 126 may each be opened and closed for each combustion cycle of the cylinder 114. Timing (e.g., crankshaft position in crank angle degrees (CAD)) of opening of the intake valve 118 for a combustion cycle of the cylinder 114 may be referred to as intake valve opening timing. Timing (e.g., in CAD) of opening of the exhaust valve 126 for a combustion cycle of the cylinder 114 may be referred to as exhaust valve opening timing. Timing of closing of the intake and exhaust valves 118 and 126 for a combustion cycle of the cylinder 114 may be referred to as intake and exhaust valve closing timing, respectively, (e.g., in CAD).

A crankshaft position sensor 170 monitors rotation of the crankshaft and generates a crankshaft position signal based on rotation of the crankshaft. For example only, the crankshaft position sensor 170 may include a variable reluctance (VR) sensor or another suitable type of crankshaft position sensor.

The crankshaft position sensor 170 may generate pulses in the crankshaft position signal as teeth of a toothed wheel pass the crankshaft position sensor 170. The toothed wheel rotates with the crankshaft. Each pulse corresponds to an angular rotation of the crankshaft by an amount approximately equal to 360° divided by the number of teeth of the toothed wheel. The toothed wheel may also include a gap of one or more missing teeth, and the gap may be used as an indicator of one complete revolution of the crankshaft (i.e., 360° of crankshaft rotation).

A cylinder pressure sensor 174 may be provided that measures pressure within the cylinder 114 and that generates a cylinder pressure signal based on the pressure. A cylinder pressure sensor may be provided for each cylinder of the engine 102. In various implementations, the cylinder pressure sensor 174 may be omitted, and the pressure within the cylinder 114 (cylinder pressure) may be estimated (determined) based on one or more other parameters.

One or more other sensors 178 may also be implemented. For example, the other sensors 178 may include a mass air flowrate (MAF) sensor, a manifold absolute pressure (MAP) sensor, an intake air temperature (IAT) sensor, a coolant temperature sensor, an oil temperature sensor, and/or one or more other suitable sensors.

The ECM 110 includes a pressure control module 190 (see also FIG. 2) that controls operation of the high pressure pump 150. The pressure control module 190 determines a target pressure for the fluid rail 154 and controls the high pressure pump 150 based on the target pressure.

Pressure within the cylinder 114 may be high at the exhaust valve opening timing of a combustion cycle of the cylinder 114. If the pressure within the fluid rail 154 is insufficient to overcome the cylinder pressure at the exhaust valve opening timing, the exhaust valve 126 may not open at all, may open later than expected, or may open to a lesser extent than expected. The pressure control module 190 therefore selectively increases the target pressure for the fluid rail 154 based on the cylinder pressure.

Figure 2:
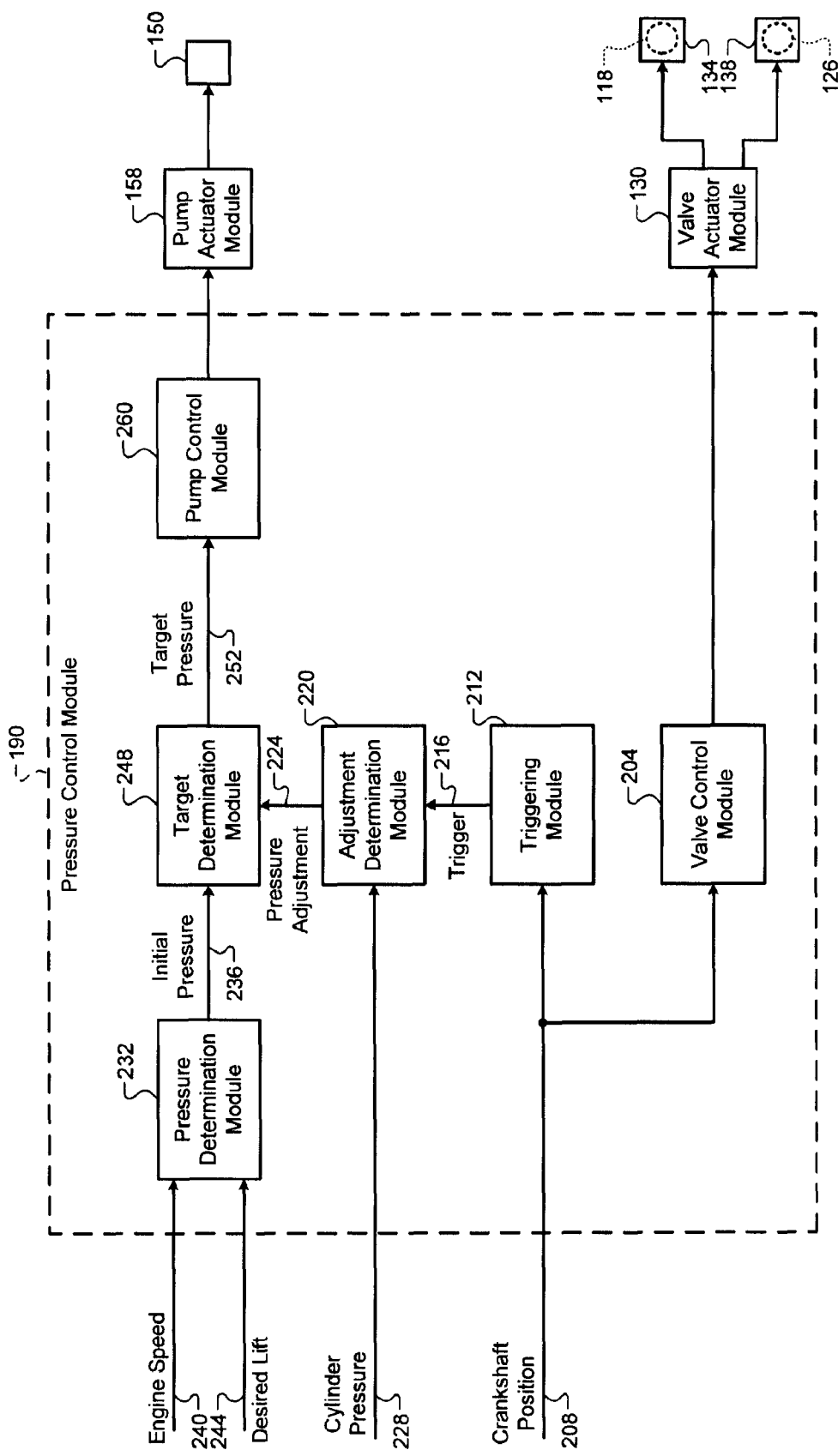
FIG. 2 is a functional block diagram of an example pressure control module according to the present disclosure.

Referring now to FIG. 2, a functional block diagram of an example implementation of the pressure control module 190 is presented. The pressure control module 190 may include a valve control module 204 that controls actuation of the three-way valves of the valve actuators to open and close the associated valves at the opening and closing timings of the valves, respectively. For example, the valve control module 204 controls the three-way valve of the exhaust valve actuator 138 to open and close the exhaust valve 126 at the opening and closing timings of the exhaust valve 126. The valve control module 204 may use a crankshaft position 208 measured using the crankshaft position sensor 170 to open and close the associated valves at the opening and closing timings, respectively.

A triggering module 212 may also monitor the crankshaft position 208. The triggering module 212 selectively generates a trigger 216 based on the opening timing of the exhaust valve 126 of a first combustion cycle of the cylinder 114. The triggering module 212 may generate the trigger 216 at the opening timing of the exhaust valve 126 of the first combustion cycle of the cylinder 114.

An adjustment determination module 220 determines a pressure adjustment 224 for the opening timing of the exhaust valve 126 for a second combustion cycle of the cylinder 114. The second combustion cycle is after the first combustion cycle. For example only, the second combustion cycle may be, for example, the next combustion cycle of the cylinder 114 after the first combustion cycle or the combustion cycle of the cylinder 114 following the next combustion cycle of the cylinder 114.

The adjustment determination module 220 determines the pressure adjustment 224 based on a pressure within the cylinder 114 (a cylinder pressure 228) when the trigger 216 is generated. In this manner, the adjustment determination module 220 determines the pressure adjustment 224 based on the cylinder pressure 228 at the opening timing of the exhaust valve 126 of the first combustion cycle.

The adjustment determination module 220 may determine the pressure adjustment 224 as a function of the cylinder pressure 228 at the opening timing of the exhaust valve 126 of the first combustion cycle. The function may be embodied as an equation or as a table. The pressure adjustment 224 is discussed further below. The cylinder pressure 228 may be measured using the cylinder pressure sensor 174 or estimated based on one or more other parameters. In sum, the adjustment determination module 220 determines the pressure adjustment 224 for the second (later) combustion cycle of the cylinder 114 based on the cylinder pressure 228 received based on (or at) the opening timing of the exhaust valve 126 for the first combustion cycle of the cylinder 114.

A pressure determination module 232 determines an initial pressure 236 for the fluid rail 154 and the opening timing of the exhaust valve 126 of the second combustion cycle. The pressure determination module 232 determines the initial pressure 236 based on an engine speed 240 and/or a desired lift 244 of the exhaust valve 126. The pressure determination module 232 may determine the initial pressure 236 as a function of the engine speed 240 and/or the desired lift 244. The function may be embodied as an equation or as a table.

A target determination module 248 determines a target pressure 252 for the fluid rail 154 and the opening timing of the exhaust valve 126 of the second combustion cycle based on the initial pressure 236 and the pressure adjustment 224. The target determination module 248 determines the target pressure 252 as a function of the initial pressure 236 and the pressure adjustment 224. In an example, the target determination module 248 may set the target pressure 252 equal to a product of the initial pressure 236 and the pressure adjustment 224. In such an example, the pressure adjustment 224 may be a scalar value. In another example, the target determination module 248 may set the target pressure 252 equal to a sum of the initial pressure 236 and the pressure adjustment 224. In such an example, the pressure adjustment 224 may be a pressure value.

Generally, the adjustment determination module 220 increases the pressure adjustment 224 as the cylinder pressure 228 increases and vice versa. When the cylinder pressure 228 is less than a predetermined pressure, however, the adjustment determination module 220 may set the pressure adjustment 224 equal to a predetermined value. The target determination module 248 sets the target pressure 252 equal to the initial pressure 236 when the pressure adjustment 224 is equal to the predetermined value.

For the example where the target determination module 248 sets the target pressure 252 equal to the product of the initial pressure 236 and the pressure adjustment 224, the adjustment determination module 220 may set the pressure adjustment 224 equal to one (i.e., the predetermined value is one) when the cylinder pressure 228 is less than the predetermined pressure. For the example where the target determination module 248 sets the target pressure 252 equal to the sum of the initial pressure 236 and the pressure adjustment 224, the adjustment determination module 220 may set the pressure adjustment 224 equal to zero (i.e., the predetermined value is zero) when the cylinder pressure 228 is less than the predetermined pressure. The adjustment determination module 220 increases the pressure adjustment 224 from the predetermined value as the cylinder pressure 228 increases from the predetermined pressure and vice versa. The predetermined pressure may be calibratable and may be set based on a minimum value of the cylinder pressure 228 where the exhaust valve 126 may not open at all, may open later than expected, or may open to a lesser extent than expected for a given combustion cycle.

A pump control module 260 controls operation of the high pressure pump 150 to achieve the target pressure 252 within the fluid rail 154 for the opening timing of the exhaust valve 126 of the second combustion cycle. The pump control module 260 may, for example, receive a pressure measured within the fluid rail 154 using a pressure sensor (not shown) and control operation of the high pressure pump 150 in closed-loop based on the target pressure 252 and the measured pressure within the fluid rail 154. Adjusting (increasing) the initial pressure 236 based on the pressure adjustment 224 when the cylinder pressure 228 is greater than the predetermined pressure may ensure proper opening of the exhaust valve 126.

Figure 3:
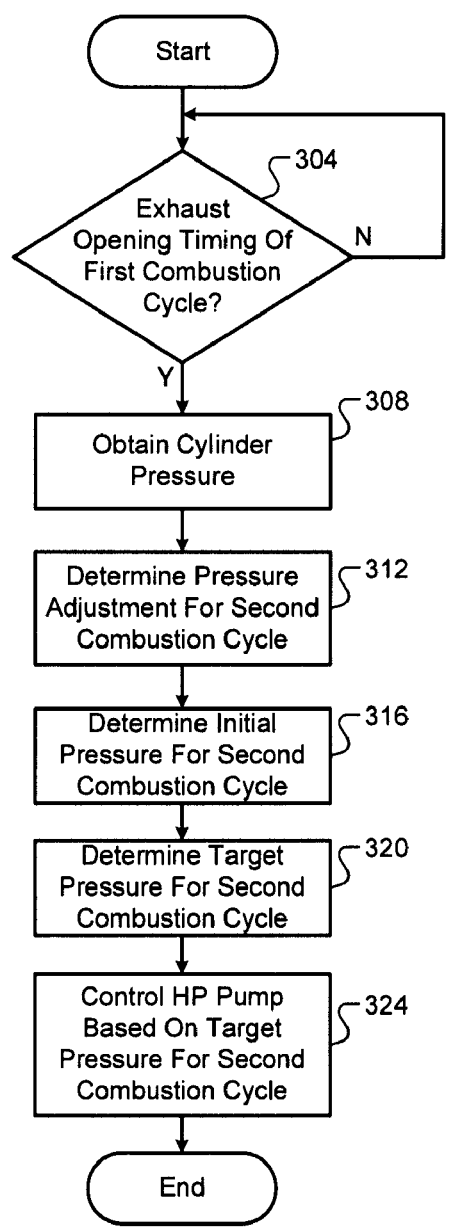
FIG. 3 is flowchart depicting an example method of controlling hydraulic fluid provided to fully flexible valve actuators according to the present disclosure.

Referring now to FIG. 3, a flowchart depicting an example method of controlling the high pressure pump 150 is presented. Control may begin with 304 where control may determine whether the crankshaft position 208 is at the opening timing of the exhaust valve 126 of the first combustion cycle of the cylinder 114. If true, control continues with 308; if false, control may remain at 304.

At 308, control obtains the cylinder pressure 228. The cylinder pressure 228 may be measured using the cylinder pressure sensor 174 or estimated based on one or more other parameters. At 312, control determines the pressure adjustment 224 for the second (later) combustion cycle of the cylinder 114 based on the cylinder pressure 228 obtained based on or at the opening timing of the exhaust valve 126 of the first combustion cycle of the cylinder 114. When the cylinder pressure 228 is less than the predetermined pressure, control may set the pressure adjustment 224 equal to the predetermined value so the target pressure 252 will be set equal to the initial pressure 236. The pressure adjustment 224 may increase from the predetermined value as the cylinder pressure 228 increases from the predetermined pressure.

Control determines the initial pressure 236 for the opening timing of the exhaust valve 126 of the second combustion cycle of the cylinder 114 at 316. Control may determine the initial pressure 236 based on the engine speed 240 and/or the desired lift 244.

At 320, control determines the target pressure 252 for the opening timing of the exhaust valve 126 of the second combustion cycle of the cylinder 114. Control determines the target pressure 252 based on the initial pressure 236 and the pressure adjustment 224. In an example, control may set the target pressure 252 equal to the product of the initial pressure 236 and the pressure adjustment 224. In another example, control may set the target pressure 252 equal to the sum of the initial pressure 236 and the pressure adjustment 224. At 324, control regulates operation of the high pressure pump 150 based on achieving the target pressure 252 within the fluid rail 154 for the opening timing of the exhaust valve 126 for the second combustion cycle. Control may, for example, regulate stroke or displacement of the high pressure pump 150.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An engine control system for a vehicle, comprising:
   a pressure determination module that determines a first pressure for a hydraulic fluid for intake and exhaust valve actuators of an engine;

a valve control module that actuates a first valve to apply the first pressure of hydraulic fluid to an intake valve actuator of a cylinder of the engine;

an adjustment determination module that receives a cylinder pressure of a first exhaust valve opening timing of a first combustion cycle of the cylinder and that determines a pressure adjustment for a second exhaust valve opening timing of a second combustion cycle of the cylinder based on the cylinder pressure of the first combustion cycle, wherein the second combustion cycle is after the first combustion cycle, wherein the adjustment determination module (i) increases the pressure adjustment as the cylinder pressure increases and (ii) decreases the pressure adjustment as the cylinder pressure decreases;

a target determination module that determines a target pressure for the second exhaust valve opening timing of the second combustion cycle of the cylinder based on the first pressure and the pressure adjustment, that increases the target pressure when the pressure adjustment increases, and that decreases the target pressure when the pressure adjustment decreases, wherein the valve control module further actuates a second valve to apply the target pressure of hydraulic fluid to an exhaust valve actuator of the cylinder for the second exhaust valve opening timing; and a pump control module that, when the target pressure increases, increases an output of a hydraulic fluid pump and that, when the target pressure decreases, decreases the output of the hydraulic fluid pump.

2. The engine control system of claim 1 wherein the target determination module determines the target pressure as a function of the first pressure and the pressure adjustment.

3. The engine control system of claim 1 wherein the target determination module sets the target pressure equal to a product of the first pressure and the pressure adjustment.

4. The engine control system of claim 1 wherein the target determination module sets the target pressure equal to a sum of the first pressure and the pressure adjustment.

5. The engine control system of claim 1 wherein the pressure determination module determines the first pressure based on an engine speed.

6. The engine control system of claim 5 wherein the pressure determination module determines the first pressure further based on a desired lift of the exhaust valve.

7. The engine control system of claim 1 wherein the pressure determination module determines the first pressure as a function of an engine speed and a desired lift of the exhaust valve.

8. The engine control system of claim 1 wherein the adjustment determination module sets the pressure adjustment equal to a predetermined value when the cylinder pressure is less than a predetermined pressure, and wherein the target determination module sets the target pressure equal to the first pressure when the pressure adjustment is equal to the predetermined value.

9. The engine control system of claim 8 wherein the adjustment determination module selectively increases the pressure adjustment from the predetermined value as the cylinder pressure increases from the predetermined pressure and selectively decreases the pressure adjustment toward the predetermined value as the cylinder pressure decreases toward the predetermined pressure.

10. An engine control method for a vehicle, comprising:
determining a first pressure for a hydraulic fluid for intake and exhaust valve actuators of an engine;

actuating a first valve to apply the first pressure of hydraulic fluid to an intake valve actuator of a cylinder of the engine;

receiving a cylinder pressure of a first exhaust valve opening timing of a first combustion cycle of the cylinder;

determining a pressure adjustment for a second exhaust valve opening timing of a second combustion cycle of the cylinder based on the cylinder pressure of the first combustion cycle, wherein the second combustion cycle is after the first combustion cycle, wherein determining the pressure adjustment includes (i) increasing the pressure adjustment as the cylinder pressure increases and (ii) decreasing the pressure adjustment as the cylinder pressure decreases;

determining a target pressure for the second exhaust valve opening timing of the second combustion cycle of the cylinder based on the first pressure and the pressure adjustment;

increasing the target pressure when the pressure adjustment increases;

decreasing the target pressure when the pressure adjustment decreases;

actuating a second valve to apply the target pressure of hydraulic fluid to an exhaust valve actuator of the cylinder for the second exhaust valve opening timing;

when the target pressure increases, increasing an output of a hydraulic fluid pump for an opening timing of an exhaust valve of the cylinder; and when the target pressure decreases, decreasing the output of the hydraulic fluid pump for the opening timing of the exhaust valve of the cylinder.

11. The engine control method of claim 10 further comprising determining the target pressure as a function of the first pressure and the pressure adjustment.

12. The engine control method of claim 10 further comprising setting the target pressure equal to a product of the first pressure and the pressure adjustment.

13. The engine control method of claim 10 further comprising setting the target pressure equal to a sum of the first pressure and the pressure adjustment.

14. The engine control method of claim 10 further comprising determining the first pressure based on an engine speed.

15. The engine control method of claim 14 further comprising determining the first pressure further based on a desired lift of the exhaust valve.

16. The engine control method of claim 10 further comprising determining the first pressure as a function of an engine speed and a desired lift of the exhaust valve.

17. The engine control method of claim 10 further comprising:
setting the pressure adjustment equal to a predetermined value when the cylinder pressure is less than a predetermined pressure; and
setting the target pressure equal to the first pressure when the pressure adjustment is equal to the predetermined value.

18. The engine control method of claim 17 further comprising:
selectively increasing the pressure adjustment from the predetermined value as the cylinder pressure increases from the predetermined pressure; and
selectively decreasing the pressure adjustment toward the predetermined value as the cylinder pressure decreases toward the predetermined pressure.

* * * * *